United States Patent [19]

Duffey

[11] 4,174,656
[45] Nov. 20, 1979

[54] VALVE ACTUATOR

[75] Inventor: Donn W. Duffey, Pittsburgh, Pa.

[73] Assignee: Rockwell International Corporation, Pittsburgh, Pa.

[21] Appl. No.: 815,473

[22] Filed: Jul. 14, 1977

Related U.S. Application Data

[63] Continuation of Ser. No. 663,787, Mar. 4, 1976, abandoned.

[51] Int. Cl.² .......................... F01B 31/00; F16J 15/16
[52] U.S. Cl. .................................... 92/134; 92/165 R; 138/31
[58] Field of Search ............... 92/134; 91/165; 138/31, 138/30; 60/404

[56] References Cited

U.S. PATENT DOCUMENTS

| | | | |
|---|---|---|---|
| 354,014 | 12/1886 | Easton | 91/165 |
| 2,479,454 | 8/1949 | Annin | 92/134 |
| 2,721,446 | 10/1955 | Bumb | 60/404 |
| 2,943,642 | 7/1960 | Westcott, Jr. | 138/31 |
| 3,248,879 | 5/1966 | Natho | 138/31 |

Primary Examiner—Paul E. Maslousky

[57] ABSTRACT

A valve actuator is capable of being mounted on a valve in alignment with a valve stem which can be moved to open and close the valve. The actuator includes a hydraulic cylinder and a piston slidably mounted within the cylinder. A piston rod is joined at a first side of the piston and extends outwardly of the cylinder toward the valve to be joined to the valve stem. A high pressure gas accumulator is mounted on the cylinder and includes a generally spherical shaped pressure wall which is intersected by the cylinder to locate an end of the cylinder within the accumulator to allow communication of the interior of the accumulator with a second side of the piston. Hydraulic oil acting on the first side of the piston opens the valve against high pressure gas within the accumulator and evacuation of the hydraulic oil allows the high pressure gas to act on the second side of the piston to rapidly close the valve.

6 Claims, 2 Drawing Figures

VALVE ACTUATOR

This is a continuation, of application Ser. No. 663,787, filed Mar. 4, 1976, now abandoned.

BACKGROUND OF THE INVENTION

1. Field of the Invention

This invention relates to an actuator for a valve and, more specifically, to such an actuator which includes a hydraulic cylinder and piston arrangement in which a generally sperical shaped accumulator is mounted on the cylinder to provide a reservoir of high pressure gas for reliable closure of the valve as hydraulic pressure is relieved.

2. Description of the Prior Art

There have herebefore been utilized a number of means for closing large valves in the feedwater and steam systems of nuclear power plants. Because of safety and reliability requirements for these plants, the time required to close the valves within the system and the ability of the valves to safely withstand seismic shock are of real concern. While electrical motor operators have been used for reliable closure of heavy duty valves of this type in the past, the closure time required has generally made them unattractive.

It is presently felt that a valve actuator incorporating a hydraulic cylinder and gas accumulator affords the best means for rapid closure of the valve. Hydraulic oil is directed to a piston within the hydraulic cylinder to open the valve in opposition to a precharged source of high pressure gas which acts on the other side of the piston. A reservoir of the high pressure gas is maintained in an accumulator to ensure a sufficient quantity is available to act on the piston to rapidly close the valve when the hydraulic pressure is relieved. While it is obvious that an accumulator might be provided in the form of a tank at a remote location from the valve, it is preferred to have a self-contained system. One such system presently employed for use with balanced globe valves up to 32" includes a cylinder within a cylinder configuration in which the high pressure gas is located between the cylinders. However, this configuration is not inexpensive to provide and the size and weight of the outer cylinder required to provide ample closing forces is recognized as being a significant factor to be considered in a determination of the ability of the valve to withstand seismic shock.

Additionally, although this configuration has ensured rapid closure of balanced valves in the past, its applicability for use with unbalanced gate valves is questionable. There are indications that the larger forces which would be needed to close a comparable sized gate valve would require an outer cylinder of significantly larger dimensions and weight, greatly complicating the seismic problems and space problems which must be considered in power plant design.

SUMMARY OF THE INVENTION

It is, therefore, an object of the invention to provide a valve actuator having a hydraulic cylinder and gas accumulator configuration which is self-contained, weighs less and is less expensive to manufacture.

It is another object to provide a valve actuator of the type described which includes an accumulator having a generally spherical shaped wall which is mounted to the hydraulic cylinder.

It is a further object to provide a valve actuator of the type described in which the spherical shaped wall is intersected by the hydraulic cylinder to locate an end of the cylinder within the interior of the accumulator.

These and other objects of the invention are provided by the preferred embodiment thereof in the form of a valve actuator which is capable of being mounted on a valve in alignment with a valve stem which can be moved to open and close the valve. The actuator includes a hydraulic cylinder and a piston slidably mounted within the cylinder. A piston rod is joined at a first side of the piston and extends outwardly of the cylinder toward the valve through an opening in a first end of the cylinder for sealed, sliding movement therethrough. The rod has an extended end which is capable of being joined to the valve stem. A high pressure gas accumulator is mounted on the cylinder and has a generally spherical shaped pressure wall which is intersected by the cylinder to locate a second end of the cylinder within the accumulator to allow communication of an interior of the accumulator with a second side of the piston.

DETAILED DESCRIPTION OF THE PREFERRED EMBODIMENT

Figure 1:
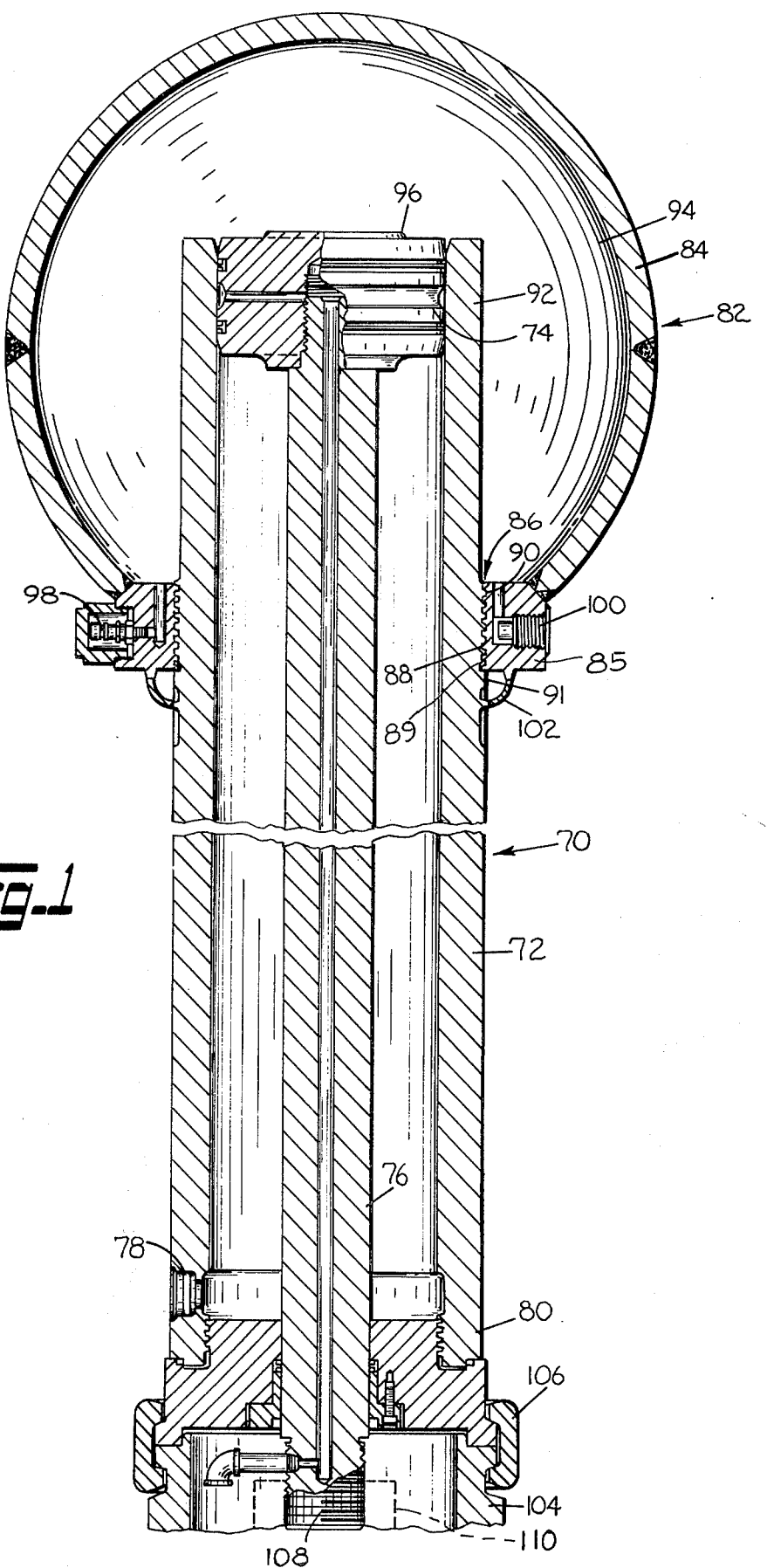
FIG. 1 is a sectional side view of a preferred valve actuator including various features of the invention.
Figure 2:
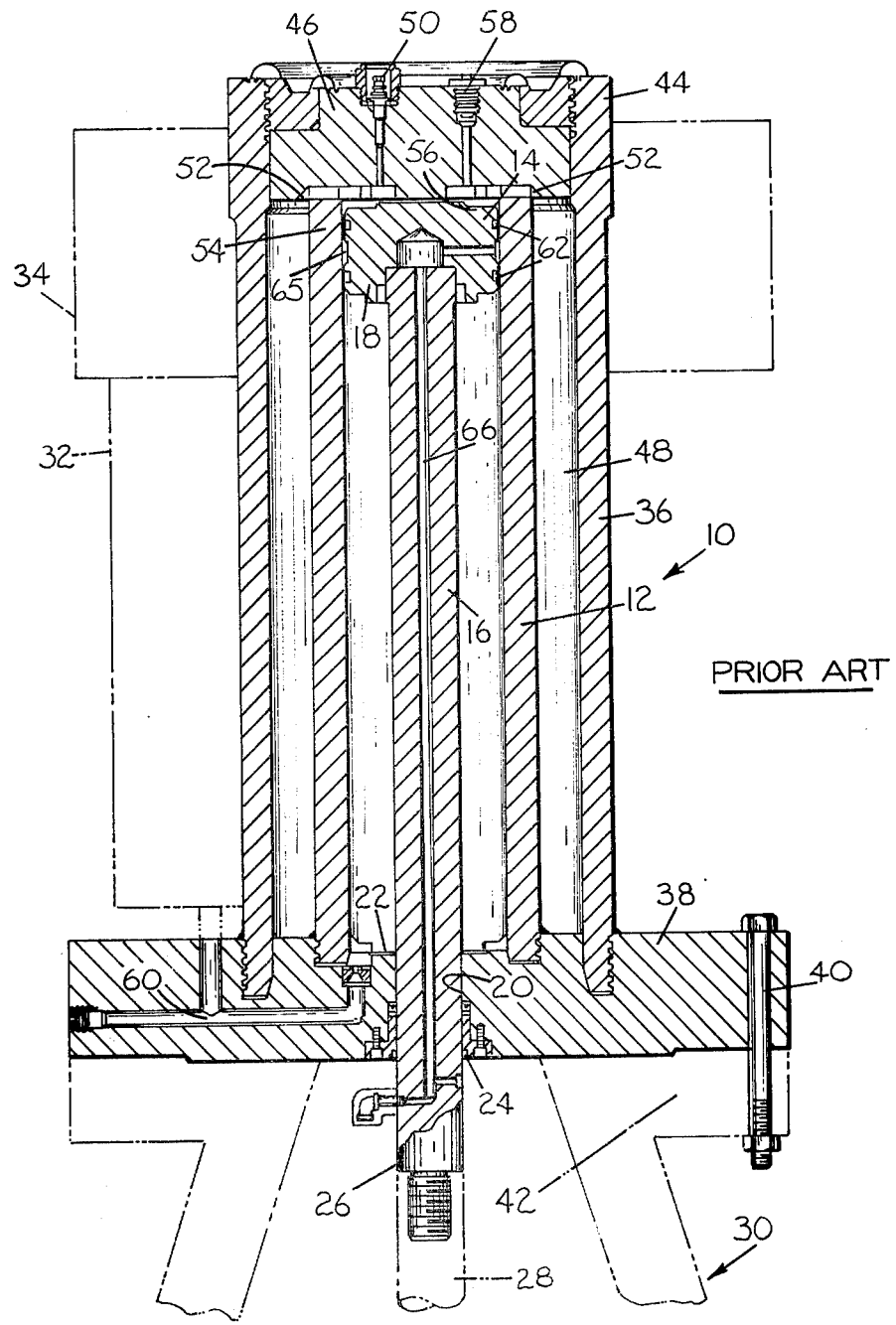
FIG. 2 is a sectional side view of a prior art valve actuator.

Although FIG. 1 shows the preferred valve actuator of the present invention, it is perhaps best to first discuss the prior art actuator of FIG. 2.

As seen in FIG. 2, a prior art valve actuator 10 includes a hydraulic cylinder 12 with a piston 14 slidably mounted therein. A piston rod 16 is mounted at a first side 18 of the piston 14 to extend outwardly of the cylinder 12 through a hole 20 in the lower end 22 of the cylinder. A sealing device 24 encircles the rod 16 at hole 20 to prevent the loss of hydraulic oil from the cylinder 12 while allowing sliding movement of the rod 16 therethrough. An extended end 26 of the rod 16 is joined to a valve stem 28 of a valve 30 on which the actuator 10 is mounted.

A hydraulic pump and manifold system 32 (shown in phantom) can be of any type well known in the art which is capable of providing hydraulic fluid for controlled positioning of the piston 14. An oil reservoir 34 (also shown in phantom) can extend at least partially around the valve actuator 10 to provide a supply of hydraulic oil for the pump and manifold 32 when the valve is opened and a collector for hydraulic oil when the valve is closed.

To provide the positive means needed for closing the valve 30, the prior art valve actuator 10 further includes a high pressure gas cylinder 36 which encircles the cylinder 12 to completely encase it therein. The lower end of the gas cylinder 36 is, like the cylinder 12, sealably mounted to a flange member 38 which includes a means in the form of bolts 40 for securing the actuator 10 to the upper structure 42 of the valve 30. The upper end 44 of the cylinder 36 includes a sealed closure 46 to generally confine the gas between the flange member 38 and the end closure 46 and to generally define a high pressure gas accumulator 48 in the space between the cylinders 36 and 12.

The end closure 46 includes a gas valve 50 for precharging the accumulator 48 to a desired, predetermined pressure when the piston 14 is in a lowered position (at the opposite end of the cylinder from the position shown in FIG. 2). Since there is an access space 52 between the upper end 54 of cylinder 12 and the end closure 46, the gas is free to flow between the accumulator 48 and the upper portion of cylinder 12 to act on the second side 56 of the piston 14. A pressure transducer 58, also provided in the end closure 46, is used for monitoring the pressure of the gas.

With the piston 14 at the lower end of the cylinder 12, the piston rod 16 has acted on the stem 28 to close the valve 30. When it is desired to open the valve 30, the pump and manifold 32 are employed to pump hydraulic oil through a supply and discharge line 60 integrally formed in the flange member 38. As the hydraulic oil acts on the first side 18 of the piston 14, the rod 16 and stem 28 begin to move upwardly. The hydraulic pressure is of sufficient magnitude to overcome the precharged gas pressure in the upper portion of the cylinder 12 and the accumulator 48. The pumping of hydraulic oil is continued until the piston 14 is relocated at the upper end 54 of the cylinder 12, as shown in FIG. 2, at which time the valve 30 will be in the open position. In this position, the high pressure gas will be primarily contained within the accumulator 48 and will be at a significantly higher pressure than the precharge pressure because of the decreased volume resulting from piston movement.

If rapid closure of the valve 30 is desired, because of a line rupture or some other operational requirement, the pump and manifold system 32 is remotely controlled to allow evacuation of the hydraulic oil from the cylinder 12 by way of the supply and discharge line 60. With resistance to piston movement removed, the high pressure gas in the accumulator 48 will act on the second side 56 of the piston 14 to rapidly close the valve.

To ensure reliable operation of the actuator 10, the piston 14 is provided a pair of piston sealing rings 62 to prevent the passage of oil and/or gas around the piston 14. As an added protection against the formation of a gas-hydraulic oil mixture, a circumferential groove 65 between the rings 62 and a drain line 66 are formed in the piston 14 and rod 16. The drain line 66 extends downwardly through the interior of the rod 16 to a discharge location below the cylinder 12 which allows access thereto for monitoring the effectiveness of the sealing rings 62.

Although the valve actuator 10 described hereinabove has provided an adequate means for rapidly closing balanced globe valve in nuclear power plants, it does include features which require serious consideration when designing a power plant. Because of the potential hazard to the general population which a nuclear power plant is said to present a number of rigid and extensive safety requirements must be met. As stated hereinabove, a valve actuator must be capable of meeting certain closure time requirements in case of dangerous line rupture. However, to ensure that a sufficient force is available to rapidly close the valve, the encircling cylindrical configuration of the prior art actuator 10 requires a relatively heavy, large structure to retain the gas at expected, high operating pressures. The weight and size of the outer cylinder significantly contribute to the total eccentric weight of a valve which is to be installed in the system. The amount of weight extending in a cantilevered fashion from the feedwater or steam line presents structural problems which must be solved when seismic shock requirements are considered. The double cylinder design includes a large flange member 38, in order to provide a support means for the larger diameter cylinder, which further increases the weight of the actuator.

As seen in FIG. 1, a preferred valve actuator 70 of the present invention also includes a similar hydraulic cylinder 72, piston 74 and piston rod 76 configuration. A similar oil reservoir, pump and manifold system (not shown) are mounted to the actuator 70 for control of hydraulic oil into and out of a supply and discharge line 78, located at the lower end 80 of the cylinder 72. However, in the preferred embodiment, the outer cylinder has been eliminated by providing a high pressure gas accumulator 82 having a spherical shaped pressure wall 84. The pressure wall 84 includes fastening portion 85 with an opening 86 therethrough having a diameter generally matching the outer diameter of the cylinder 72. Interior threads 88 of the opening 86 are adapted to engage matching threads 90 about an intermediate portion 89 of outer surface 91 of the cylinder 72 for positive retention of the cylinder 72 therein. Accordingly, the spherical shaped pressure wall 84 is intersected by the cylinder 72 as it is mounted on the cylinder 72 at threads 90. So mounted, the upper end 92 of the cylinder 72 is disposed within the interior 94 of the accumulator 82 to afford free communication of the interior 94 with the upper side 96 of the piston 74. As with actuator 10, the upper end 92 of the cylinder 72 is generally opened for free gas communication to the interior of the cylinder 72 when the piston 74 is lowered. A gas valve 98 and a pressure transducer 100 again allow precharging of the accumulator and monitoring of the gas pressure therein. A flexible metallic seal 102 at the lower end of the spherical shaped pressure wall 84 encircles the outer surface 91 of the cylinder 72 and is welded thereto to ensure retention of the high pressure gas.

Since the preferred spherical shaped pressure wall 84 only partially receives the cylinder 72 therein, the accumulator 82 does not extend to the lower end 80 of the cylinder 72. This eliminates the need for so large a flange member as 38 of the prior art actuator 10. Further, although the preferred actuator 70 might include a similar flange member but one having a small diameter to extend around the cylinder 72, the lower end 80 of the cylinder 72 and the upper structure 104 of the valve have been adapted to be joined by a conventional yoke lock ring 106 which is well known in the art as the extended end 108 is secured to the valve stem 110 (shown in phantom). As a result, the preferred actuator 70 accommodates an improved mounting means while affording some reduction in weight and material.

It has also been found by the present invention that providing an accumulator with a generally spherical shape, despite the fact that it is intersected by a cylinder, affords a significantly better gas volume to overall weight ratio than can be obtained with the accumulator of the prior art configuration. It should be noted that the preferred actuator is not truly spherical because of the intersection by the hydraulic cylinder. Further, as the diameter of the cylinder approaches the diameter of the generally spherical shaped wall, it is apparent that the exact shape of the lower half of the accumulator becomes less significant. For example, it might be preferred for manufacturing reasons to cast the hydraulic cylinder with an integrally formed upwardly flared frustrum section thereon which section would serve as the lower half of the accumulator. A preferred hemispherical upper section could be welded on the frustrum to provide an accumulator which is mounted on the cylinder and within the scope of the invention. In any case, an accumulator which includes a major portion which lies within a generally spherical surface will posses the desired strength characteristics which makes the improved gas volume to overall weight ratio possible.

To verify the advantages of the preferred actuator, a computer analysis of comparable actuator configurations for a balanced, 32" globe valve of the type mentioned hereinabove was conducted. A comparison was made of material weight (prior to machining), material costs, and manufacturing time expected. The dimensions of the cylinder 72 and the generally spherical shaped pressure wall 84 and the relative amount of insertion of the cylinder 72 within the wall 84 were determined from various combinations of standard cylinder sizes and hemisphere sizes available for use in manufacturing. Accordingly, the preferred configuration is not intended to present the optimum pressure to weight ratio design, but rather one which may be practically supplied. Nevertheless, it was found that a prior art actuator 10, including the hydraulic cylinder, piston, piston rod, etc., would require about 3,350 pounds of material and about 120 hours of time to manufacture. A comparable valve actuator 70 incorporating the above described features of the present invention would weigh only about 1,200 pounds at a material cost which is less than half that of the actuator 10 and require only about 75 hours of manufacturing time.

With the savings of material by weight and cost each being greater than one-half and the manufacturing time being reduced by about one-third, the preferred actuator 70 obviously represents a substantial improvement over the prior art actuator 10 while continuing to provide effective, reliable valve closure. Additionally, the aforementioned weight reduction further ensures safe operation of the valve even if the power plant were subjected to seismic shock forces of a higher magnitude than the prior art actuator would have been able to withstand.

With an increasing interest in the use of gate valves in nuclear power plant systems, the advantages described hereinabove become even more significant. It should initially be understood that a comparable sized, unbalanced gate valve requires only a slightly longer piston closing stroke than a balanced globe valve, but that the expected, required opening and closing forces would be greatly increased, on an order of about five times the force needed for the globe valve. For the same stroke, this increased force, in turn, requires the piston to be provided a larger diameter for the gas to be maintained at a similar pressure while still ensuring rapid closure. As a result, the hydraulic cylinder would have a diameter over twice as large as the embodiments shown in FIGS. 1 and 2 although the height would be similar. With the cylinder having greater than twice the original volume, the volume of the accumulator would also be more than doubled to generate the same gas pressures through valve operation.

It can be seen that to employ an accumulator, as shown in FIG. 2, with an outer cylinder to encircle a larger hydraulic cylinder while retaining the same gas pressure would significantly increase its diameter and weight requirements. Initial evaluations indicate that the outside diameter would extend well beyond the outside dimensions of the valve to make installation in the system highly impractical and that the weight would make compliance with seismic requirements highly unlikely. In short, the preferred configuration makes possible the practical use of a hydraulic-gas actuator for rapid closure of some valves which would not heretofore have been possible.

While the embodiment discussed hereinabove represents the preferred valve actuator for a particular large valve utilizing available manufacturing material, it should be obvious that significant alterations may be made while remaining within the scope of the invention as claimed. It might, for example, be found that the most efficient closing pressure to weight ratio can be obtained by decreasing the amount of insertion of the hydraulic cylinder into the accumulator. On the other hand, where height limitations within a particular power plant installation dictate, the length of insertion of the hydraulic cylinder within the accumulator might approach the diameter of the accumulator. Additionally, the method employed to mount the spherical shaped pressure wall on the cylinder and the method of mounting the cylinder to the valve might be changed to any number of means well known in the valve manufacturing art. Similarly, although general manufacturing procedures and seismic considerations would presently seem to indicate otherwise, it would be possible, if desired, to mount the spherical shaped pressure wall in an eccentric manner with respect to the hydraulic cylinder.

What is claimed is:

1. A valve actuator comprising:
   a hydraulic cylinder having a first and a second end, a central axis and a cylinderical inner surface with a uniform diameter along a length of said axis between said first and said second ends;
   piston means slidably mounted within said cylinder for axial movement along said length between said first end and said second end of said cylinder, said piston means having a first side and a second side which extend across said diameter for sealed, sliding contact with said inner surface of said cylinder along said length;
   an actuator rod joined at said first side of said piston means, extending through an opening in said first end of said cylinder for sealed, sliding movement therethrough and terminating at an extended end thereof which is outwardly of said cylinder;
   said first end of said cylinder being secured to a valve housing and said extended end of said rod being secured to a valve stem;
   a high pressure gas accumulator mounted on said cylinder, said accumulator having a generally spherical shaped pressure wall which is intersected by said cylinder to locate said second end of said cylinder within said accumulator, said second end having a passage therethrough to allow communication of an interior of said accumulator with said second side of said piston means;
   said generally spherical shaped pressure wall including an upper section thereof which is hemispherical, centrally located on said axis and located relative to said cylinder such that an interior surface of said section lies within a spherically shaped surface which if continued would extend through said cylinder to locate said second end of said cylinder totally within said spherically shaped surface and to also locate said second side of said piston means within said spherically shaped surface when said piston means is axially located along said length toward said second end of said cylinder; and an access hole through said first end of said cylinder for supplying hydraulic fluid to said cylinder to act on said first side of said piston means to cause movement thereof toward said second end of said cylinder in opposition to a predetermined quantity of high pressure gas on said accumulator and for discharging said fluid to allow said predetermined quantity of high pressure gas to act on said second side of said piston means to cause movement thereof toward said first end of said cylinder.

2. A valve actuator as set forth in claim 1, wherein said predetermined quantity of said high pressure gas is provided to said accumulator as it is precharged with said gas at a predetermined pressure when said piston means is axially located along said length toward said first end of said cylinder.

3. A valve actuator as set forth in claim 1, wherein said upper section includes an internal diameter which is at least twice as large as said diameter of said cylinder.

4. A valve actuator comprising:
a hydraulic cylinder having a first and a second end, a central axis and a cylindrical inner surface with a uniform diameter along a length of said axis between said first and said second ends;

piston means slidably mounted within said cylinder for axial movement along said length between said first end and said second end of said cylinder, said piston means having a first side and a second side which extend across said diameter for sealed, sliding contact with said inner surface of said cylinder along said length;

an actuator rod joined at said first side of said piston means, extending through an opening in said first end of said cylinder for sealed, sliding movement therethrough and terminating at an extended end thereof which is outwardly of said cylinder;

said first end of said cylinder being secured to a valve housing and said extended end of said rod being secured to a valve stem;

a high pressure gas accumulator mounted on said cylinder, said accumulator having a generally spherical shaped pressure wall which is intersected by said cylinder to locate said second end of said cylinder within said accumulator, said second end having a passage therethrough to allow communication of an interior of said accumulator with said second side of said piston means;

said generally spherical shaped pressure wall including an upper section thereof which is hemispherical and centrally disposed about said axis and a curved transition section which extends from said upper section, curves below a portion of said second end having said passage therethrough, and sealably joins said cylinder intermediate said first and said second ends; and an access hole through said first end of said cylinder for supplying hydraulic fluid to said cylinder to act on said first side of said piston means to cause movement thereof toward said second end of said cylinder in opposition to the high pressure gas of said accumulator and for discharging said fluid to allow said high pressure gas to act on said second side of said piston means to cause movement thereof toward said first end of said cylinder.

5. A valve actuator as set forth in claim 4, wherein said high pressure gas is precharged to said accumulator at a predetermined pressure when said piston means is axially located along said length toward said first end of said cylinder.

6. A valve actuator as set forth in claim 4, wherein said upper section includes an internal diameter which is at least twice as large as said diameter of said cylinder.

* * * * *